United States Patent
Barajas et al.

(10) Patent No.: US 8,577,815 B2
(45) Date of Patent: Nov. 5, 2013

(54) METHOD AND SYSTEM FOR CONCURRENT EVENT FORECASTING

(75) Inventors: Leandro G. Barajas, Troy, MI (US); Youngkwan Cho, Los Angeles, CA (US); Narayan Srinivasa, Oak Park, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1042 days.

(21) Appl. No.: 12/604,606

(22) Filed: Oct. 23, 2009

(65) Prior Publication Data

US 2011/0099136 A1   Apr. 28, 2011

(51) Int. Cl.
  *G06F 15/18* (2006.01)
  *G06N 3/00* (2006.01)
  *G06N 3/12* (2006.01)

(52) U.S. Cl.
  USPC .......................................................... 706/13

(58) Field of Classification Search
  None
  See application file for complete search history.

(56) References Cited

U.S. PATENT DOCUMENTS

| 7,292,960 B1 | 11/2007 | Srinivasa et al. |
| 7,526,461 B2 | 4/2009 | Srinivasa et al. |

OTHER PUBLICATIONS

Buche, D., M. Milano, and P. Koumoutsakos (Jul. 2002). Self-Organizing Maps for Multi-Objective Optimization. In A. M. Barry (Ed.), GECCO 2002: Proceedings of the Bird of a Feather Workshops, Genetic and Evolutionary Computation Conference, New York, pp. 152-155. AAAI.*

Matthew Butler, Ali Daniyal; Multi-objective Optimization with an Evolutionary Artificial Neural Network for Financial Forecasting; GECCO'09, Jul. 8-12, 2009, Montréal Québec, Canada. Copyright 2009 ACM 978-1-60558-325-9/09/07.*

T. Kohonen, Self-organized formation of topologically correct feature maps, Biological Cybernetics, No. 43, pp. 59-69, 1982.

Vesanto et al., Self-Organizing Map in Matlab: the SOM Toolbox, Proceedings of the Matlab DSP Conference, pp. 35-40, Espoo, Finland, Nov. 1999.

* cited by examiner

*Primary Examiner* — Kakali Chaki
*Assistant Examiner* — Luis Sitiriche
(74) *Attorney, Agent, or Firm* — Quinn Law Group, PLLC (57) ABSTRACT

A method and system for characterizing, detecting, and predicting or forecasting multiple target events from a past history of these events includes compressing temporal data streams into self-organizing map (SOM) clusters, and determining trajectories of the temporal streams via the clusters to predict the multiple target events. The system includes an evolutionary multi-objective optimization (EMO) module for processing the temporal data streams, which are obtained from a plurality of heterogeneous domains; a SOM module for characterizing the temporal data streams into self-organizing map clusters; and a target event prediction (TEP) module for generating prediction models of the map clusters. The SOM module employs a vector quantization method that places a set of vectors on a low-dimensional grid in an ordered fashion. The prediction models each include trajectories of the temporal data streams, and the system predicts the multiple target events using the trajectories.

16 Claims, 8 Drawing Sheets

METHOD AND SYSTEM FOR CONCURRENT EVENT FORECASTING

TECHNICAL FIELD

The present invention relates to a method and a system for predicting/forecasting certain events of interest, and in particular to a self-organizing, multi-objective method and system for forecasting multiple concurrent events.

BACKGROUND OF THE INVENTION

Data mining is the process of discovering useful patterns in data. Patterns in the mined data may be initially hidden and unknown, and could include useful information such as event frequency, magnitude, duration, and/or cost. Data mining draws from several fields, including but not limited to machine learning, statistics, and database design. Techniques used in data mining may include clustering, associative rules, visualization, and probabilistic graphical dependency models, all of which may be used to identify the hidden and potentially useful data that is often distributed across multiple and heterogeneous databases in a manufacturing environment.

Temporal data mining (TDM) is a particular branch of data mining. TDM refers to the application of data mining concepts to find patterns in a time-based or temporal stream of data. There are four components of any TDM method: sampling of the data, i.e., time sampling, encoding or embedding of the data, extracting temporal patterns from the data, and then learning the extracted temporal patterns using a machine learning model or other techniques.

SUMMARY OF THE INVENTION

Accordingly, a method and a system are provided herein that enable the prediction of multiple events of interest, i.e., target events, from a temporal data-driven perspective. Temporal data for the target events is provided describing the past history of occurrences of these events, and models are automatically generated and used to make predictions about future occurrences of the same events. Various temporal data-based approaches may be used with other methods to predict a single low frequency, high impact target event. The present method and system characterizes and forecasts or predicts multiple such target events of interest from their past history, in part by using a compressed stream of all available temporal data.

More particularly, the temporal data streams are automatically compressed into self-organizing map (SOM) clusters, and then the trajectories of the compressed temporal data streams are viewed via the SOM clusters. Therefore, multiple target events may be predicted simultaneously using multiple data sources. Additionally, the method and system make use of an evolutionary algorithm approach as described herein that can jointly optimize the parameters of the SOM clusters and a target event prediction algorithm to enable accurate predictions of a relatively large number of target events of interest, while at the same time minimizing the occurrence of false predictions.

The method may be embodied in algorithmic form and executed via a host machine or controller to simultaneously model multiple fault events and automatically make predictions of future occurrences based on these past events. Unlike certain prior art methods, the present invention can accurately predict more than one fault or event at a time without constructing separate models for each target event.

In particular, the method includes simultaneously characterizing and predicting multiple target events from historical temporal data streams of past occurrences of these events, encoding the temporal data into self-organizing maps in multiple dimensions, creating trajectories of temporal data in the compressed N-dimensional self-organizing map space, and applying an evolutionary multi-objective algorithm to estimate the parameters of the prediction model using the trajectory data to maximize accuracy while minimizing false alarms.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Referring to the drawings, wherein like reference numbers correspond to like or similar components throughout the several figures, a system 10 is adapted for executing the method of the present invention via an algorithm 100. Execution of algorithm 100 provides an integrated prognostics capability based on comprehensive data from real-time and historic data.

The data is heterogeneous, i.e., is provided from any number of sources, largely unknown and unlimited, and in many varying and incompatible formats. The data may have high dimensionality, i.e., the data may include hundreds of data streams, with each stream having dozens of parameters to be used jointly for prediction of all data streams simultaneously. The data may come from heterogeneous domains, i.e., the data may be provided or obtained from various different manufacturing systems in varying formats, such as from production, quality, error-proofing, electronic pull system, option data delivery, upload/download and compare, routing and tracking systems, and/or maintenance systems.

There are several technical challenges to be overcome in multiple event forecasting as set forth herein. First, the relevant data has high dimensionality from heterogeneous domains as explained above. Second, given the nature of manufacturing processes, the events that provide the various data sets are typically asynchronous. Data may be noisy, and may sometimes be missing or inconsistent. This may be further exacerbated with the fact that some of the data sources themselves may not be very reliable, or may have human-induced aberrations. The optimality of prognostics capability usually deals with multiple objectives which often conflict with each other.

Integrated prognostics capability for heterogeneous manufacturing systems has multiple objectives, e.g., high accuracy, low false alarm, and low operating cost. Some of these objectives may conflict. To develop efficient capability, the objectives should be simultaneously optimized and a set with multiple optimal solution may be found.

Figure 1:
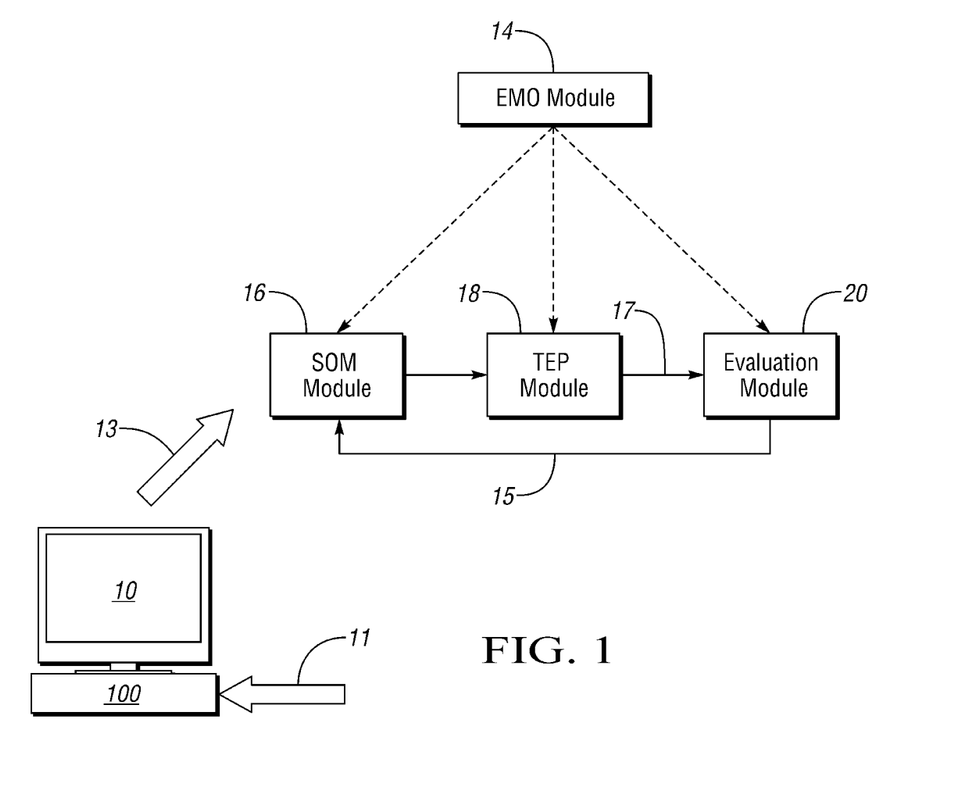
FIG. 1 is a data and control flow diagram for a system in accordance with the invention.
Figure 2A:
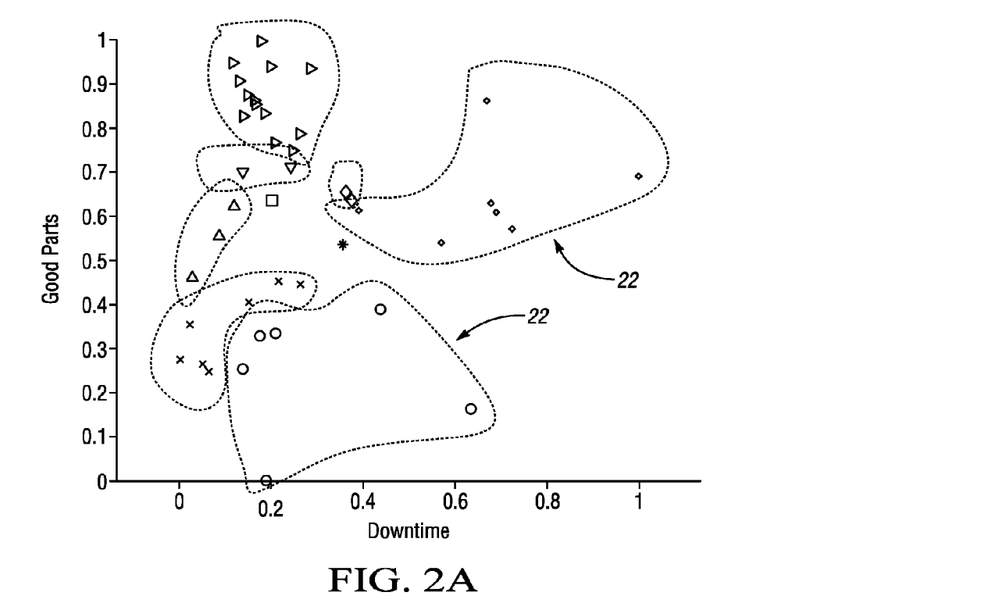
FIG. 2A is a multi-dimensional self-organizing map (SOM) according to one embodiment.
Figure 2B:
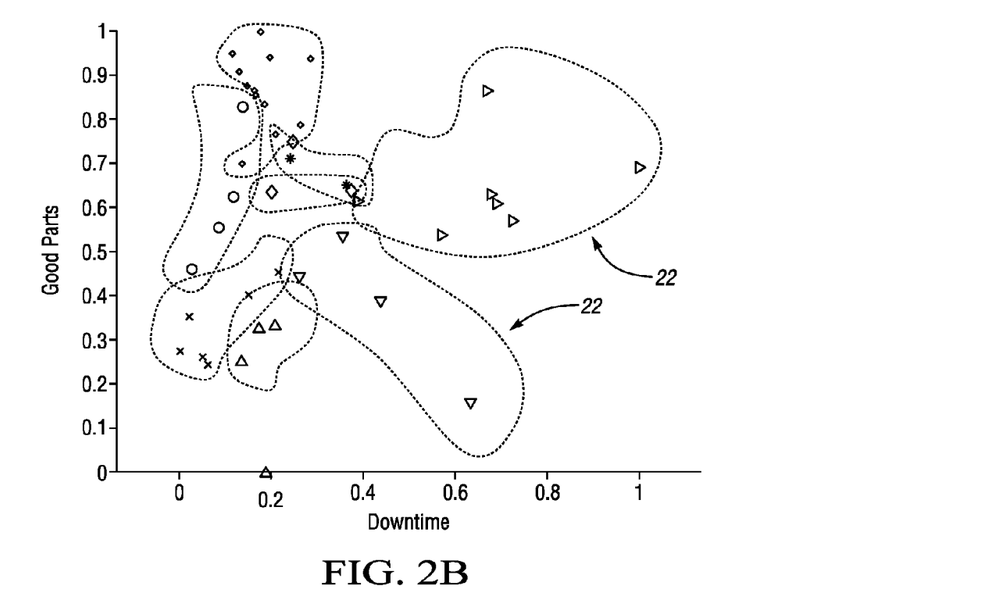
FIG. 2B is a multi-dimensional SOM according to another embodiment.
Figure 2C:
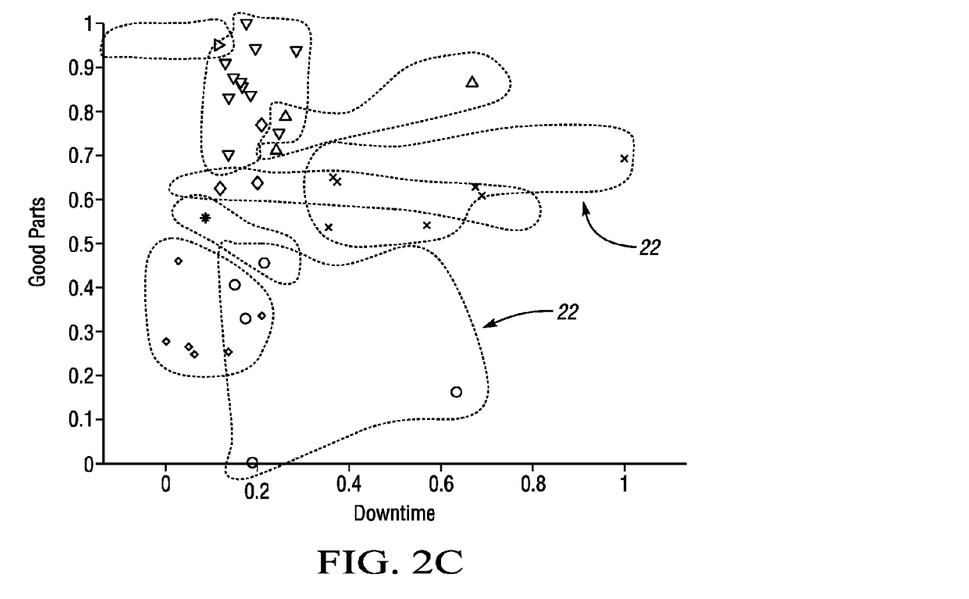
FIG. 2C is multi-dimensional SOM according to yet another embodiment.
Figure 2D:
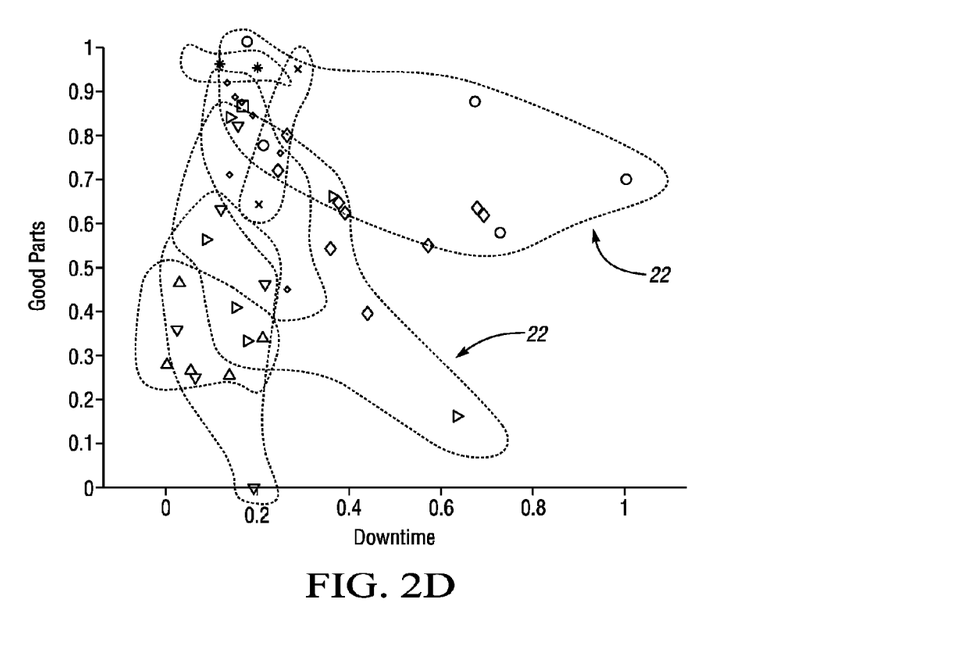
FIG. 2D is a multi-dimensional SOM according to yet another embodiment.
Figure 3A:
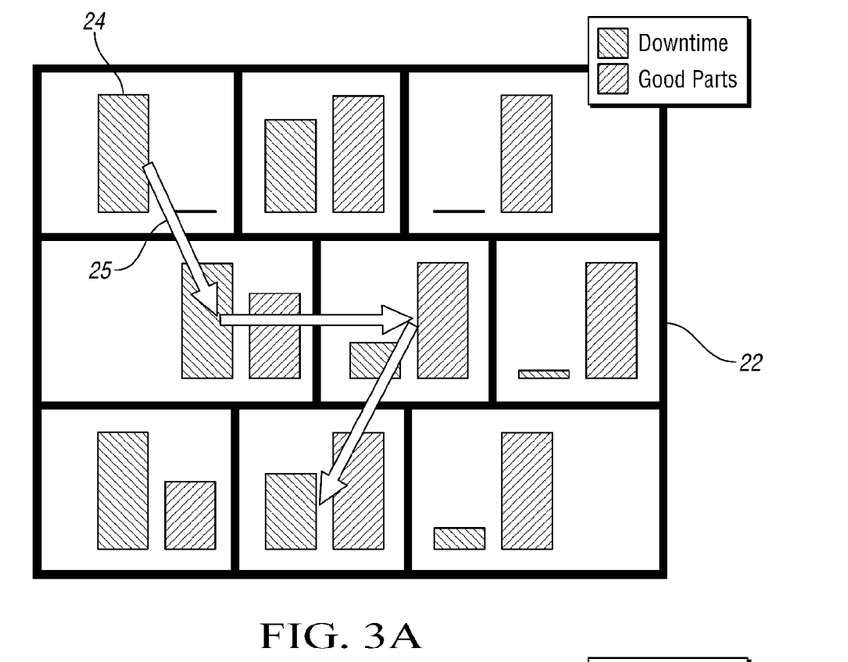
FIG. 3A is a set of cluster and trajectory diagrams for the system shown in FIG. 1.
Figure 3B:
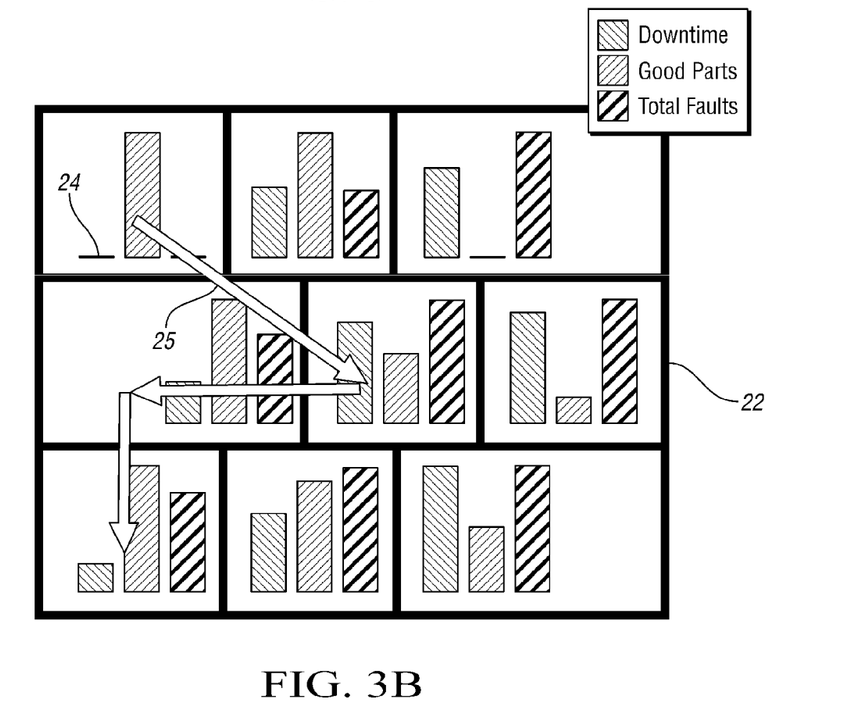
FIG. 3B is another set of cluster and trajectory diagrams for the system shown in FIG. 1.
Figure 3C:
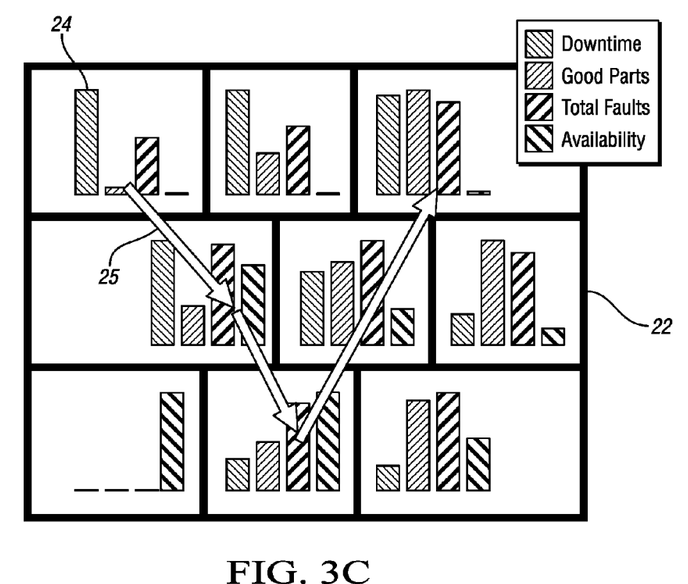
FIG. 3C is yet another set of cluster and trajectory diagrams for the system shown in FIG. 1.
Figure 3D:
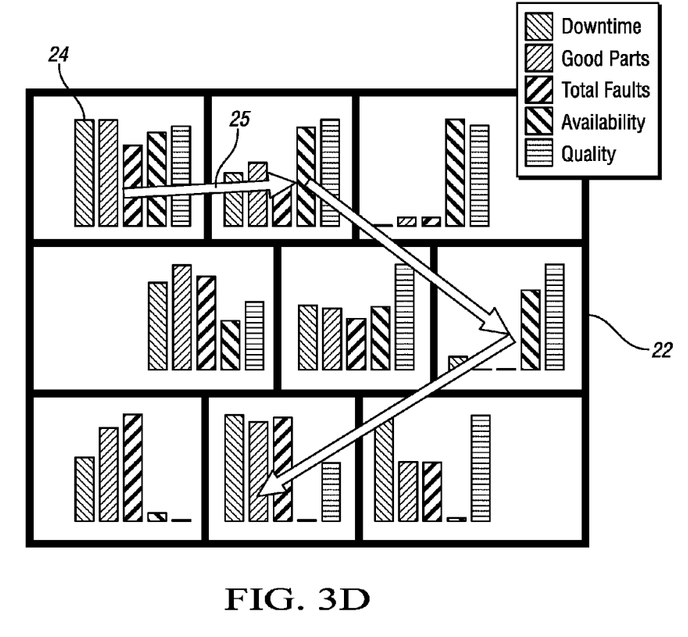
FIG. 3D is yet another set of cluster and trajectory diagrams for the system shown in FIG. 1.

In FIG. 1, the execution of the algorithm 100 processes the temporal data streams 11 using a multi-stage approach. At the top level, data stream 11 is processed using an evolutionary multi-objective optimization (EMO) module 14, i.e., a derivative of search and optimization techniques based on evolutionary methods, including but not limited to evolutionary computation, genetic algorithms, and genetic programming. EMO module 14 is primarily used to solve problems where there are multiple and often conflicting objectives. See for example "Applications of Multi-Objective Evolutionary Algorithms" by Coello et al., Singapore: World Scientific Publishing Co. Pte. Ltd., ISBN 981-256-106-4. EMO module 14 maps the data stream 11 into the problem space being considered.

The data stream 11 has high dimensionality obtained from heterogeneous domains, and includes noise as noted above. A target event predictor module 18 accepts and predicts only one-dimensional event series, i.e., single output/single input (SISO) signals. See for example Srinivasa et al. (U.S. Pat. No. 7,292,960). The data stream 11 is mapped into one dimension (1D) and requires a noise reduction process. The system 10 may employ resampling, constraint, normalization or standardization techniques at the level of the EMO module 14 to render the data from different domains compatible while retaining characteristics of the domains.

The system 10 also utilizes a self-organizing map (SOM) module 16 to map the data from high dimensional space into low dimensional space. By mapping high-dimensional data into lower-dimensional clusters using SOM module 16, the capability of target event prediction (TEP) is expanded to multiple output, multiple input (MIMO) systems. Therefore, the present invention combines the techniques of EMO, SOM, and TEP per the respective EMO module 14, SOM module 16, and TEP module 18, along with an evaluation module 20 which feeds back data 15 to the SOM module 16, in order to provide an automatic prognostic model for heterogeneous manufacturing systems.

The system 10 may be configured as a digital computer generally comprising a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in the system 10 or accessible thereby, including the algorithm 100 for predicting multiple target events in accordance with the invention as described below, can be stored in ROM and automatically executed to provide the respective functionality.

Still referring to FIG. 1, most data optimization problems have several possibly conflicting objectives that must be satisfied. Optimization as used herein refers to finding a solution or set of solutions which would give the values of all of the objective functions designated as acceptable by a decision maker. Multi-objective optimization problems (MOP) can be defined mathematically as follows: Find an n-dimensional decision variable vector $\vec{x}$ which will satisfy the constraints: $g_i(\vec{x}) \leq 0$, $i=1, \ldots, m$, and that will optimize objective functions $F(\vec{x})=(f_1(\vec{x}), \ldots, f_k(\vec{x}))$. In manufacturing systems in particular, there are many possible constraints, e.g., physical limitations, time-related constraints, financial problems, and so on. There are also many possible objectives such as low implementation/operating costs, high flexibility, etc. With multiple objectives, it may be difficult to tell which solution is more optimal between multiple possible solutions.

The EMO module 14 adopts Pareto optimality. As will be understood by those of ordinary skill in the art, vector $\vec{u}=(u_1, \ldots, u_n)$ is said to dominate $v=(v_1, \ldots, v_n)$, denoted by $\vec{u} \prec \vec{v}$ iff $\forall i, u_i \leq v_i$ and $\exists i, u_i < v_i, i=1, \ldots, n$. For a given MOP $F(\vec{x})$, the Pareto optimal set P* is defined as: $P^* := \{\vec{x}^* \in \Omega | \neg \exists \vec{x} \in \Omega, F(\vec{x}) \prec F(\vec{x}^*)\}$ where $\Omega$ is the domain of decision variable vectors. For a given MOP $F(\vec{x})$ and Pareto optimal set P*, the Pareto front PF* is defined as: $PF^* := \{F(\vec{x}) | \vec{x} \in P^*\}$.

Evolutionary algorithms are particularly suitable for MOP because they deal simultaneously with a set of possible solutions, i.e., the "population", and find several members of the Pareto optimal set in a single run of the algorithm. Evolutionary algorithms are also less susceptible to the shape or continuity of the Pareto front, as that term is understood in the art. EMO module 14 thus navigates the vector space of the decision variables and manages the population of decision variable vectors through the various generations with evolutionary algorithms. Using SOM module 16 and TEP module 18, the EMO module 14 constructs a prediction model 17 and evaluates multiple objective functions for each individual model via an evaluation module 20. Through the generations, i.e., multiple feedback loops as represented by arrow 15, EMO module 14 automatically selects optimal results and produces the Pareto optimal set of decision variable vectors as explained below with reference to FIGS. 4 and 5.

The algorithm 100 may be generally described as follows, with algorithm 100 described in further detail below with reference to FIG. 5: (a) the algorithm standardizes each input feature; (b) P←initial population of decision variable vectors; and (c) the algorithm 100 loops until certain termination conditions are satisfied, as indicated by arrow 15. For each individual in P under item (c), EMO module 14 clusters high dimensional data using SOM module 16, develops an TEP model with the clustered data using the TEP module 18, and evaluates the objective functions with the TEP model using the evaluation module 20. When certain termination conditions are satisfied, P* will retain the Pareto optimal vectors of the decision variables.

Still referring to FIG. 1, the SOM module 16 employs a vector quantization method which places the prototype vectors on a regular low-dimensional grid in an ordered fashion. SOM module 16 may use a neural network as the low-dimensional grid. As will be understood by those of ordinary skill in the art, a neural network is an information processing paradigm capable of looking at a total or composite set of detectable or measurable process variables or parameters, typically referred to as a "signature", and of estimating or modeling a result or outcome based on this signature. A neural network can be configured to recognize composite patterns and predict a result when exposed to a new pattern, or it can be configured to process a plurality of different input variables in a particular manner as described below in order to estimate or model the outcome. Also as will be understood by those of ordinary skill in the art, a neural network can continuously improve its accuracy over time by exposing the neural network to additional and varied signatures or input sets, and correlating the estimated or modeled outcome with actual observed or measured results.

Each neuron in the neural network used by SOM module 16 is a d-dimensional weight vector, i.e., a prototype or codebook vector, where d is equal to the dimension of the input vectors. The neurons may be connected to adjacent neurons by a neighborhood relation, which dictates the topology or structure of the map. The SOM process itself can be thought of as a net which may be spread over a "data cloud". A SOM training algorithm moves the weighted vectors so that they spread across the data cloud, and so that the map is automatically organized: neighboring neurons on the grid get similar weight vectors.

Referring to FIG. 2A-2D, SOM module 16 of FIG. 1 may be used to map high dimensional data into a lower and correlated dimensional space resulting in this way in different clustering solutions. Two-dimensional (2D), three-dimensional (3D), four-dimensional (4D), and five-dimensional (5D) data clusters are shown in FIGS. 2A, 2B, 2C, and 2D, respectively. These high dimensional clusters are depicted in a 2D space projection for visualization purposes. All elements of a cluster are depicted with the same symbol, such as triangles, circles, or squares. Data from heterogeneous domains is noisy and highly dimensional as noted above. To feed data into the TEP module 18, SOM module 16 maps the noisy and high-dimensional data into low-dimensional clusters 22 based on the decision variables from the EMO module 14.

An aspect of the present invention is to translate the temporal inputs from multiple target events into clustered maps, as shown in FIGS. 2A-D, and then to translate the temporal information of transitions between target events in the form of trajectories in the SOM module 16. These trajectories can be represented as a string of events, e.g., abcdacb ..., where "a" is a cluster that represents the multi-dimensional temporal data input at a given time in the SOM module 16. The string itself represents a sequence of events in the clustered space.

Referring to FIGS. 3A-D, examples of such trajectories are shown for SOMs with 2D, 3D, 4D, and 5D dimensional inputs, respectively, wherein the trajectories are shown by the arrows 25. It must be noted that the selection of the order of the dimensional space directly influences the clustering and trajectory results. The number of different color bars 24 per cluster 22 reflects the dimensionality of the input space. For clarity, each plot shows only nine clusters 22, however more or fewer clusters in equal or different geometrical arrangements may be used without departing from the intended scope of the present invention.

Figure 4:
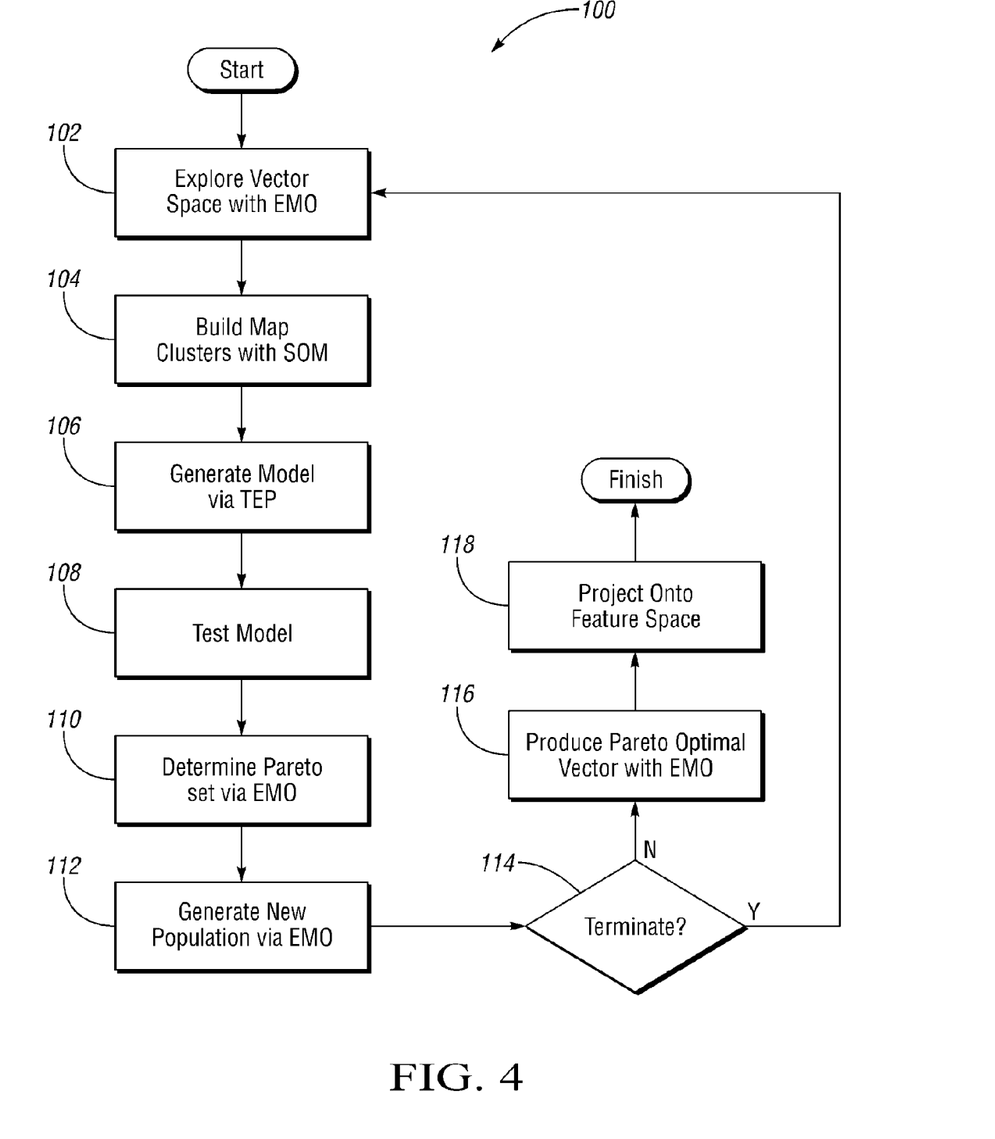
FIG. 4 is a flow chart describing the method of the invention.

Referring to FIG. 4, TEP module 18 of FIG. 1 is an infrequent but severe event prediction algorithm mining for event patterns that could be extracted from past history. Based on the decision variables from EMO module 14, the TEP module 18 analyzes the training data for the patterns of event classes using a sliding time window. Example of TEP module 18 include, but are not limited to, predictive algorithms and the system set forth in Srinivasa et al. (U.S. Pat. No. 7,292,960), to name just a few.

The training data is provided in the form of trajectories in SOM space as described above with reference to FIGS. 3A-D. The patterns of event classes within the time window preceding a particular target event, i.e., the event to be predicted, are extracted as target event predictors. TEP module 18 builds a prediction model for the target event from the target event predictors, and then tests the model using testing data and passes back the prediction model and the testing result to the EMO module 14.

By combining the components of EMO module 14, standardization, the SOM module 16, and the TEP module 18 as shown in FIG. 1, an integrated prognostics model may be created for heterogeneous manufacturing systems. Input data may be collected from a number of domains including but not limited to: production, quality, error-proofing, electronic pull system, option data delivery, upload/download & compare, routing and tracking systems, fault reporting, and/or maintenance systems. Decision variables may include length of sliding time window to identify a target cluster, and choice of target cluster.

Objective functions for the prediction may be selected, e.g., accuracy of a measurement, a false alarm rate, and a false negative rate. Accuracy may be defined as $(TP+TN)/(TP+TN+FP+FN)$, false alarm rate as $FP/(FP+TN)$, and false negative rate as $FN/(FN+FP)$, where TP is a count of true positives, TN is a count of true negatives, FP is a count of false positives, and FN is a count of false negatives. Objective functions may also include business or engineering objectives or metrics including but not limited to power and/or water consumption rates, cost, an absenteeism rate, an overtime rate or other value, a machine and/or human resources utilization rate, etc.

Referring to FIG. 4 in conjunction with the system 10 of FIG. 1, the algorithm 100 may be executed by system 10 of FIG. 1 to simultaneously characterize, detect, and predict multiple target events from historical temporal data streams of past occurrences of these events. The algorithm 100 begins at step 102, wherein the EMO module 14 explores the decision vector space of a predetermined "triple" decision variable, e.g., length of a sliding time window, number of clusters, and choice of target cluster, and then passes each triple to SOM module 16 and TEP module 18.

At step 104, SOM module 16 maps standardized data into low-dimensional clusters according to the passed triple decision variable "number of clusters". The algorithm 100 then proceeds to step 106.

At step 106, TEP module 18 analyzes SOM-mapped training data and builds a prediction model. At step 108, TEP module 18 tests the model built at step 106 with SOM-mapped testing data, and then passes the model back the SOM module 14 and the test result to the EMO module 14.

At step 110, EMO module 14 evaluates the objective functions based on the test result and determines the Pareto optimal set in the current generation. The algorithm 100 proceeds to step 112, wherein the EMO module 14 generates a new population for the next generation with evolutionary algorithms, and then repeats the process until a set of termination conditions are satisfied at step 114. For example, the termination conditions at step 114 may include a maximum number of iterations or generations, mathematical convergence criteria, point density, algorithm runtime, etc. After the termination conditions of step 114 have been satisfied, the EMO module 14 produces the Pareto optimal vectors at step 116, and the algorithm 100 is finished. The sample cube 40 shown in FIG. 5 plots the objective functions and Pareto front, with the triangles 42 representing the Pareto front plains.

The origin is the farthest of the points 44 in the cube 40, as well as the most optimal point. The points 44 represented as (*) are all of the "found" solutions, while those points 44 located at the vertices of the triangles, each of which are enclosed in a small box for further clarity, are the dominate solutions belonging to the Pareto front itself. All dominating solutions are optimal by definition, and can be reduced by using external constraints or subjective parameters as understood in the art.

Figure 5:
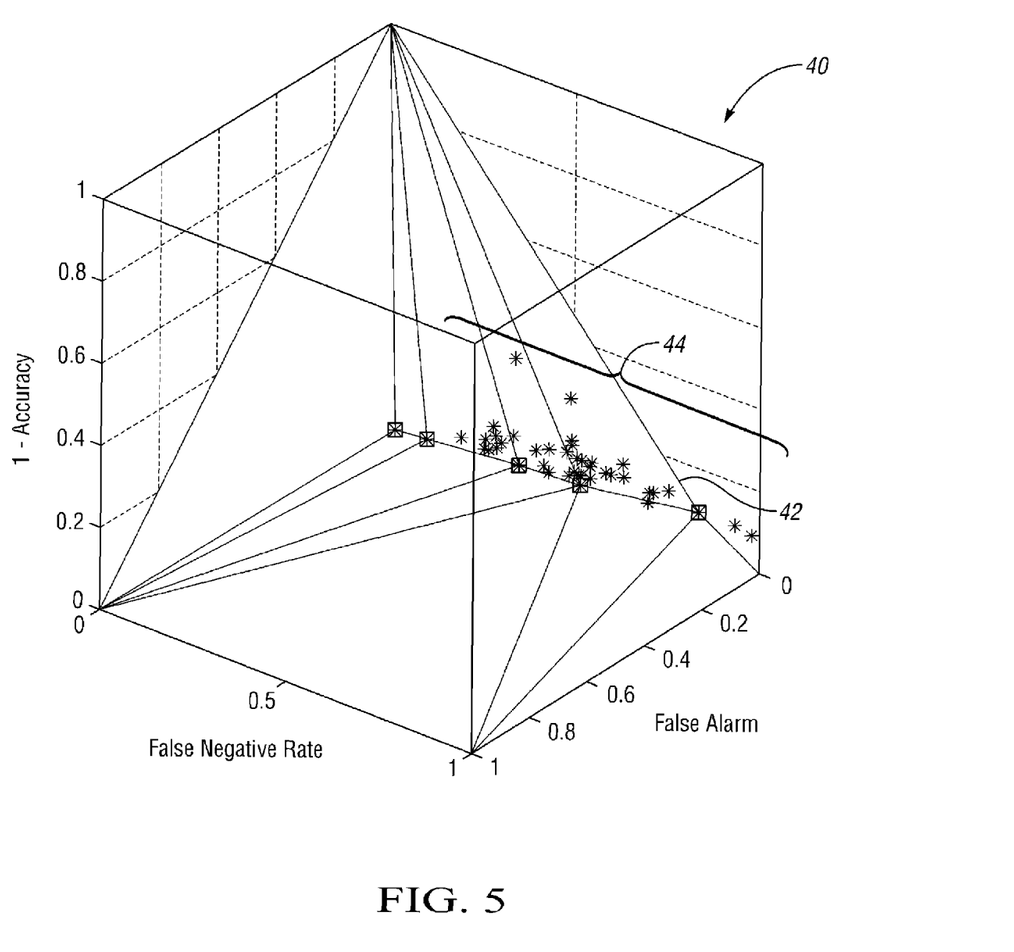
FIG. 5 is a plot of objective function values and a Pareto front.
Figure 6:
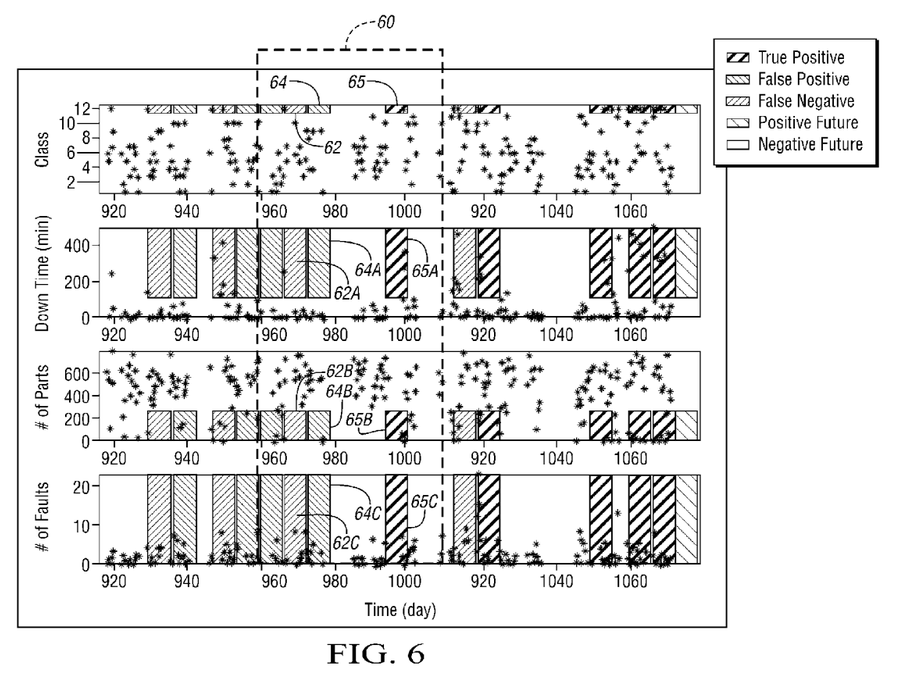
FIG. 6 is a projection of actual and predicted data onto a feature space.

At step 118, and referring to FIG. 6, the solutions are projected onto feature space, which presents actual or measured data points (*), i.e., the points 44 of FIG. 5, and a series of results boxes representing whether the prediction for that point or set of points was indeed accurate. For example, box or cluster 62 represents a false negative (FN), boxes or clusters 64 a false positive (FP), and boxes or clusters 65 a true positive (TP) result. Where no box is present, i.e., the open area between boxes or clusters 64 and 65, this represents that an event was not predicted to occur, and in fact did not occur, i.e., a negative future prediction. True negatives are not shown for the purpose of clarity, i.e., predicting that an event will not occur, and in fact the invent did not occur.

A portion 60 shown in FIG. 6 represents a selected portion of a continuum of data points, which is much reduced here for simplicity. For a given class, one may specify the criteria of a set of sub-criteria, e.g., down time, # of parts, and # of faults in the particular embodiment shown in FIG. 6. The portion 60 may, by way of example, set forth a particular range within each sub-criteria, with the result boxes 62, 64, 65 indicating the predictive result of data falling into the defined ranges. For example, given a class defined as [22.00 478.00][0.00 735.00] [00.00 35.00], this definition may refer to a data point having a downtime between 22-478 minutes, a total number of parts between 0 and 735, and a total number of faults between 0 and 35. One may vary the class definition without departing from the intended scope of the invention. Likewise, more than one class may project onto the feature space. Thus, a prediction is made that a future data point will fall into a particular range.

Using the algorithm 100 as set forth hereinabove, predictions of future events, i.e., the data labeled "class" in FIG. 6, are generated in feature/cluster space, shown in FIG. 6 for a single class for simplicity, and are then projected mapped back into real space, e.g., the data labeled "down time", "# of parts", and "# of faults". That is, the clusters 22 which are in the feature space are projected into downtime, number of faults, throughput, etc., as shown in projected clusters 62A-C, 64A-C, and 65A-C in FIG. 6.

While the best modes for carrying out the invention have been described in detail, those familiar with the art to which this invention relates will recognize various alternative designs and embodiments for practicing the invention within the scope of the appended claims.

The invention claimed is:

1. A method for simultaneously characterizing, detecting, and predicting multiple target events comprising:
    processing a plurality of temporal data streams of past occurrences of the target events using an evolutionary multi-objective optimization (EMO) module of a controller, wherein the temporal data streams are obtained asynchronously with respect to each other from a plurality of heterogeneous domains, and wherein at least some of the plurality of heterogeneous domains are of an incompatible format with the other heterogeneous domains;
    characterizing the temporal data streams from the EMO into map clusters via a vector quantization method using a self-organizing map (SOM) module of the controller, wherein the SOM module is adapted to map the temporal data streams from a high-dimensional space to a one-dimensional space, which places vectors one a one-dimension grid in an ordered fashion;
    generating prediction models of the map clusters using a target event prediction (TEP) module of the controller, wherein the prediction models each include trajectories of the temporal data streams that are represented as a string of events in the one-dimensional space; and
    estimating a future occurrence of the multiple target events using the trajectories from the TEP module.

2. The method of claim 1, further comprising using an evaluation module of the controller to evaluate multi-objective functions for each of the prediction models.

3. The method of claim 1, wherein characterizing the temporal data streams includes compressing and encoding the temporal data streams into self-organizing maps.

4. The method of claim 3, wherein the trajectories are created in a map space of the self-organizing maps.

5. The method of claim 1, wherein the EMO module utilizes at least one of: an evolutionary computation algorithm and a genetic algorithm.

6. The method of claim 1, wherein the EMO is adapted for executing a standardization algorithm to thereby render compatible the temporal data from the heterogeneous domains.

7. The method of claim 1, wherein the EMO adopts Pareto optimality to determine a Pareto front.

8. A method for simultaneously characterizing, detecting, and predicting multiple target events comprising:
    obtaining high-dimensional temporal data streams asynchronously with respect to each other from a plurality of heterogeneous domains using an evolutionary multi-objective optimization (EMO) module, wherein at least some of the plurality of heterogeneous domains are of an incompatible format with the other heterogeneous domains;
    clustering the temporal data streams into map clusters via a vector quantization method using a self-organizing map (SOM) module, wherein the vector quantization method includes placing vectors on a one-dimension grid in an ordered fashion wherein the SOM module is adapted to map the temporal data streams from a high-dimensional space to a one-dimensional space;
    generating a plurality of prediction models of the map clusters using a target event detector (TEP) module, wherein the prediction models each include trajectories of the temporal data streams that are represented as a string of events in the one-dimensional space; and
    evaluating a set of objective functions of the prediction model using the trajectories from the TEP module to thereby predict the multiple target events, wherein the objective functions at least partially define the multiple target events.

9. The method of claim 8, further comprising utilizing a neural network as the one-dimensional grid.

10. The method of claim 9, wherein each neuron in the neural network is a d-dimensional weight vector, wherein d is equal to the dimension of a set of input vectors.

11. The method of claim 8, wherein evaluating a set of objective functions includes evaluating at least one of: accuracy of a measurement, a false alarm rate, a false negative rate, a power consumption rate, a water consumption rate, a cost, an absenteeism rate, an overtime value, a machine utilization rate, and a human resources utilization rate.

12. A system for simultaneously characterizing, detecting, and predicting multiple target events based on historic temporal data streams of the target events, the system comprising:
    a computer having a processor and memory on which is recorded instructions for executing a method, wherein the instructions are executable via a plurality of modules of the computer, including:

an evolutionary multi-objective optimization (EMO) module adapted for processing a plurality of temporal data streams, obtained by the EMO module from a plurality of heterogeneous domains, wherein at least some of the plurality of heterogeneous domains are of an incompatible format with the other heterogeneous domains, and which provide the temporal data streams asynchronously with respect to each other;

a self-organizing map (SOM) module adapted for characterizing the temporal data streams from the EMO into map clusters, wherein the SOM is adapted to map the temporal data streams from a high-dimensional space to a one-dimensional space using a vector quantization method which places vectors on a one-dimension grid in an ordered fashion; and a target event prediction (TEP) module adapted for generating a plurality of prediction models of the map clusters in the one-dimensional space, wherein each TEP module includes trajectories of the temporal data streams that are represented as a string of events in the one-dimensional space;

wherein the system is configured to predict a future occurrence of the multiple target events using the trajectories from the TEP module.

13. The system of claim 12, wherein the system is adapted for estimating a set of parameters of the prediction models by evaluating multiple objective functions for each of the prediction models.

14. The system of claim 12, wherein the system is adapted for characterizing the temporal data streams by compressing and encoding the temporal data streams into self-organizing maps in multiple dimensions.

15. The system of claim 12, wherein the EMO is adapted for executing a standardization algorithm to thereby render compatible the temporal data from the heterogeneous domains, and wherein the EMO adopts Pareto optimality to determine a Pareto front.

16. The system of claim 12, wherein the SOM module utilizes a neural network as the one-dimensional grid.

* * * * *